United States Patent
Beck et al.

(10) Patent No.: US 10,352,404 B2
(45) Date of Patent: Jul. 16, 2019

(54) TRANSMISSION FOR A HYBRID VEHICLE, DRIVE TRAIN FOR A HYBRID VEHICLE HAVING SUCH A TRANSMISSION, AND METHOD FOR STARTING UP A HYBRID VEHICLE

(71) Applicant: ZF Friedrichshafen AG, Friedrichshafen (DE)

(72) Inventors: Stefan Beck, Eriskirch (DE); Martin Brehmer, Tettnang (DE); Kim Führer, Lindau (DE); Andreas Geiger, Markdorf (DE); Matthias Horn, Tettnang (DE); Thomas Riedisser, Lindau (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 15/743,477

(22) PCT Filed: Jun. 16, 2016

(86) PCT No.: PCT/EP2016/063828
§ 371 (c)(1),
(2) Date: Jan. 10, 2018

(87) PCT Pub. No.: WO2017/008985
PCT Pub. Date: Jan. 19, 2017

(65) Prior Publication Data
US 2018/0202519 A1    Jul. 19, 2018

(30) Foreign Application Priority Data
Jul. 16, 2015    (EP) .................... 15177055

(51) Int. Cl.
*F16H 3/66*   (2006.01)
*B60K 6/365*  (2007.10)
*B60K 6/48*   (2007.10)

(52) U.S. Cl.
CPC ............... *F16H 3/66* (2013.01); *B60K 6/365* (2013.01); *B60K 6/48* (2013.01);
(Continued)

(58) Field of Classification Search
CPC ............. F16H 3/66; B60K 6/48; B60K 6/365
See application file for complete search history.

(56) References Cited

U.S. PATENT DOCUMENTS 6,572,507 B1 *  6/2003  Korkmaz .................. F16H 3/66
                                              475/276
8,858,376 B2 * 10/2014  Hart ......................... F16H 3/66
                                              475/284
(Continued)

FOREIGN PATENT DOCUMENTS

DE    19912480 A1    9/2000
DE    10333429 A1    2/2005
(Continued)

OTHER PUBLICATIONS

International Search Report (English Translation) PCT/EP2016/063828, dated Sep. 5, 2015. (3 pages).

*Primary Examiner* — Patrick H Mackey
(74) *Attorney, Agent, or Firm* — Dority & Manning, P.A.

(57) ABSTRACT

A transmission (G) for a hybrid vehicle includes a drive shaft (GW1), an output shaft (GW2), three planetary gear sets (P1, P2, P3), an electric motor (EM) with a rotationally fixed stator (S) and with a rotatable rotor (R), and five shift elements (03, 04, 05, 14, 15). Six forward gear ratios (1 to 6) and one reverse gear ratio (R1) are formable through selective pairwise closure of the five shift elements.

16 Claims, 6 Drawing Sheets

(52) U.S. Cl.
CPC .............. *F16H 2200/0052* (2013.01); *F16H 2200/201* (2013.01); *F16H 2200/2043* (2013.01); *F16H 2200/2064* (2013.01); *F16H 2200/2094* (2013.01)

(56) References Cited

U.S. PATENT DOCUMENTS

| | | | | |
|---|---|---|---|---|
| 9,182,014 | B2* | 11/2015 | Beck | F16H 3/66 |
| 9,382,977 | B2* | 7/2016 | Beck | F16H 3/666 |
| 9,382,979 | B2* | 7/2016 | Beck | F16H 3/66 |
| 9,458,910 | B2* | 10/2016 | Beck | F16H 3/66 |
| 9,482,317 | B2* | 11/2016 | Beck | F16H 3/66 |
| 9,482,318 | B2* | 11/2016 | Beck | F16H 3/66 |
| 2005/0143214 | A1* | 6/2005 | Shim | F16H 3/66 475/285 |
| 2007/0238574 | A1 | 10/2007 | Gumpoltsberger | |
| 2010/0130323 | A1 | 5/2010 | Gumpoltsberger | |
| 2012/0178567 | A1* | 7/2012 | Schoenek | F16H 3/66 475/5 |

FOREIGN PATENT DOCUMENTS

| | | |
|---|---|---|
| DE | 102006006623 A1 | 9/2007 |
| DE | 102007022776 A1 | 12/2008 |

* cited by examiner

TRANSMISSION FOR A HYBRID VEHICLE, DRIVE TRAIN FOR A HYBRID VEHICLE HAVING SUCH A TRANSMISSION, AND METHOD FOR STARTING UP A HYBRID VEHICLE

FIELD OF THE INVENTION

The invention relates generally to a transmission for a hybrid vehicle, to a drivetrain for a hybrid vehicle having a transmission of said type, and to a method for launching a hybrid vehicle.

BACKGROUND

The applicant's patent application DE 199 12 480 A1 describes an automatically shiftable motor vehicle transmission having three single-carrier planetary gear sets, three brakes and two clutches for the shifting of six forward gear ratios and one reverse gear ratio, and having a drive shaft and an output shaft. The drive shaft is connected directly to the sun gear of the second planetary gear set, and is connectable by the first clutch to the sun gear of the first planetary gear set and by the second clutch to the carrier of the first planetary gear set. The sun gear of the first planetary gear set is connectable by the first brake, the carrier of the first planetary gear set is connectable by the second brake, and the sun gear of the third planetary gear set is connectable by the third brake, to the housing. The carrier of the first planetary gear set is connected to the ring gear of the second planetary gear set. The carrier of the second planetary gear set is connected to the ring gear of the third planetary gear set. The ring gear of the first planetary gear set is connected to the carrier of the third planetary gear set and to the output shaft. Furthermore, freewheels may be used at every point of the transmission, for example between a shaft and the housing.

The patent U.S. Pat. No. 8,858,376 B2 describes a transmission for a hybrid drivetrain of a vehicle, which exhibits substantially the same construction. Furthermore, said transmission includes an electric machine which is connected to the input shaft. By a launch clutch, the input shaft is connected via a damper to a motor. A freewheel connects the second element of the first planetary gear set to the housing.

The applicant's patent application DE 103 33 429 A1 presents an arrangement of the brakes and clutches for the motor vehicle transmission known in the prior art, wherein the second brake, designated D, and the first brake, designated C, are arranged directly adjacent to the first planetary gear set. Here, the second brake is arranged radially outside the first brake. Both brakes are formed as multiplate brakes.

Transmissions for hybrid vehicles commonly have an increased structural space requirement owing to the electric machine. Depending on the arrangement of the drivetrain, that is to say either parallel or transverse to the direction of travel of the hybrid vehicle, this has different effects on the hybrid vehicle. In the case of a drivetrain parallel to the direction of travel, the space availability in the interior compartment of the hybrid vehicle is impaired by the increased axial structural length. This is undesirable. In the case of a drivetrain transverse to the direction of travel, the structural space is greatly limited, because the assembly composed of internal combustion engine, electric machine and transmission is normally arranged between the longitudinal members and the wheels of the hybrid vehicle.

Furthermore, in a drivetrain, good mechanical efficiency must always be ensured. Frictionally locking shift elements, such as for example multiplate brakes, impair the efficiency, because they generate drag losses in the open state. In the case of the motor vehicle transmission known in the prior art, such drag losses arise to a particularly great extent at the second brake, because said second brake must be designed with a particularly large effective surface owing to the high torque loading, and because said second brake is closed only in the first forward gear ratio and in the reverse gear ratio. The second brake is therefore predominantly open during the operation of the motor vehicle transmission. Frictionally locking shift elements however improve the powershift characteristics of the motor vehicle transmission, and thus the shift comfort for the driver of the motor vehicle.

SUMMARY OF THE INVENTION

An object of the invention is to optimize the motor vehicle transmission known in the prior art with regard to structural space requirement and mechanical efficiency, without adversely affecting shift comfort. A further object of the invention is to specify a suitable method for launching a hybrid vehicle which has a drivetrain having a transmission of said type.

The transmission has a drive shaft, an output shaft, three planetary gear sets, an electric motor or machine with a rotationally fixed stator and with a rotatable rotor, and five shift elements.

Herein, a transmission refers in particular to a multi-ratio transmission in which a multiplicity of gear ratios, that is to say fixed transmission ratios, between the drive shaft and the output shaft of the transmission can be selected, preferably in automatic fashion, by shift elements. The shift elements are in this case for example clutches or brakes. Such transmissions are used in particular in motor vehicles for the purposes of suitably adapting the rotational speed and torque output characteristics of the drive unit to the driving resistances of the vehicle.

A planetary gear set includes a sun gear, a carrier and a ring gear. Planet gears are rotatably mounted on the carrier, which planet gears mesh with the toothing of the sun gear and/or with the toothing of the ring gear. A negative or minus gear set refers to a planetary gear set with a carrier on which the planet gears are rotatably mounted, having a sun gear and having a ring gear, wherein the toothing of at least one of the planet gears meshes both with the toothing of the sun gear and with the toothing of the ring gear, whereby the ring gear and the sun gear rotate in opposite directions of rotation when the sun gear rotates in the presence of a static carrier. A positive or plus gear set differs from the minus planetary gear set described directly above in that the plus gear set has inner and outer planet gears which are mounted rotatably on the carrier. The toothing of the inner planet gears meshes in this case at one side with the toothing of the sun gear and at the other side with the toothing of the outer planet gears. The toothing of the outer planet gears furthermore meshes with the toothing of the ring gear. This has the result that, in the presence of a static carrier, the ring gear and the sun gear rotate in the same direction of rotation.

Each of the three planetary gear sets has a first, second and third element. The first element is always formed by the sun gear of the respective planetary gear set. In the case of an embodiment as a minus gear set, the second element is formed by the carrier of the respective planetary gear set and the third element is formed by the ring gear of the respective planetary gear set. In the case of an embodiment as a plus gear set, the second element is formed by the ring gear of the respective planetary gear set and the third element is formed by the carrier of the respective planetary gear set. The third planetary gear set is always formed as a minus gear set.

The drive shaft is permanently connected to the first element of the second planetary gear set. The output shaft is permanently connected to the third element of the first planetary gear set and to the second element of the third planetary gear set. The second element of the first planetary gear set is permanently connected to the third element of the second planetary gear set. The second element of the second planetary gear set is permanently connected to the third element of the third planetary gear set. The rotor of the electric machine is permanently connected to the drive shaft, specifically either directly or via a transmission gearing.

The first element of the third planetary gear set can be rotationally fixedly immobilized by closing the first shift element, in that said first element is connected by the first shift element to a rotationally fixed structural element of the transmission, for example to the transmission housing. The second element of the first planetary gear set can be rotationally fixedly immobilized in the same way by closing the second shift element. The first element of the first planetary gear set can be rotationally fixedly immobilized in the same way by closing the third shift element. Two of the three elements of the second planetary gear set are connectable to one another by closing the fourth shift element. The first element of the first planetary gear set is connectable to the drive shaft by closing the fifth shift element.

According to the invention, the second and third shift elements are arranged axially between the electric machine and the first planetary gear set, wherein the effective radius of the third shift element is greater than the effective radius of the second shift element. Here, the effective radius is to be understood to stand for the mean radius of the region of action of the respective shift element to the axis of rotation of said shift element. The second shift element is in this case formed as a positively locking shift element, that is to say for example as a dog-clutch shift element, whereas the third shift element is formed as a frictionally locking shift element, that is to say for example as a multiplate shift element.

Such an arrangement of the second and third shift elements is suitable in particular for use in a transmission for a drivetrain which is oriented substantially parallel to the direction of travel of the motor vehicle. This is because, owing to the arrangement of the second and third shift elements axially between the electric machine and the first planetary gear set, the transmission remains radially compact, whereby a central tunnel of the motor vehicle can likewise be of compact design. The space availability in the interior compartment of the motor vehicle is thus improved. By the arrangement according to the invention of the second and third shift elements, it is furthermore possible for the axial structural length of the transmission to be kept short, specifically at the expense of the effective diameter of the second shift element. The central tunnel of the motor vehicle can thus be narrowed at an early point, whereby, likewise, the space availability in the interior compartment of the motor vehicle is improved.

Here, the embodiment of the second shift element as a positively locking shift element improves the mechanical efficiency. Positively locking shift elements produce the connection in the closed state by positive locking, and are distinguished by substantially lower drag losses in the open state than frictionally locking shift elements. The position of the second shift element radially further to the inside would be disadvantageous for a frictionally locking shift element, because, owing to the relatively small effective diameter, the number of plates would have to be increased in order to obtain the effective surface required for the introduction of friction power. The compact structural space requirement and the improvement of the efficiency can thus be achieved in particular in combination with the embodiment of the second shift element as a positively locking shift element and the arrangement of said shift element at the inside.

Here, the embodiment of the third shift element as a frictionally engaging shift element permits good powershift characteristics, even in the case of a positively locking second shift element. During a traction upshift from the first gear ratio to the second gear ratio, the third shift element can take on load, whereby the load acting on the second shift element decreases. As soon as the second shift element reaches a load-free or low-load state, the second shift element can be opened. An overrun downshift from the second forward gear ratio to the first forward gear ratio is normally not necessary. Furthermore, during a shift process between the first forward gear ratio and reverse gear ratio, no opening or closing of the second shift element is necessary, because the latter remains closed in both of these gear ratios.

The effective radius of the second shift element is preferably smaller than the radial spacing between the drive shaft axis and the axis of rotation of a planet gear of the first planetary gear set. The effective radius of the third shift element is in this case greater than the radial spacing between the drive shaft axis and the axis of rotation of the planet gear of the first planetary gear set. In other words, the axis of rotation of one of the planet gears of the first planetary gear set lies between the effective radius of the second shift element and the effective radius of the third shift element. If the first planetary gear set is formed as a plus gear set, then the axis of rotation of one of the inner planet gears is of significance. Here, the drive shaft axis is to be understood to mean the axis about which the drive shaft can rotate in the transmission. In this way, the frictionally engaging third shift element can have as large a diameter as possible, whereas the positively engaging second shift element has as small a diameter as possible. Owing to the effective diameter of the third shift element being as large as possible, the required effective surface can be realized with a small number of friction elements, whereby the efficiency is improved. The effective diameter of the second shift element which is as small as possible reduces the susceptibility thereof to jamming.

The first, fourth and fifth shift elements are preferably formed as frictionally engaging shift elements, whereby good powershift characteristics between the forward gear ratios can be achieved.

A device for actuating the second shift element is preferably arranged at least in part radially within the third shift element. In other words, the device, which is designed at least for closing the second shift element, is arranged at least in part in a structural space which is situated radially within the third shift element. It is particularly preferable for a predominant part of the device for actuating the second shift element to be situated in said structural space. This is advantageous in particular in conjunction with a second shift element formed as a positively locking shift element and a third shift element formed as a frictionally locking shift element. This is because the switchable positively locking connection can in this case be arranged in the direct vicinity of the second element of the first planetary gear set, whereby the structural design is simplified. The third shift element can be arranged at a large diameter, which is advantageous for a frictionally locking shift element. The structural space radially within the third shift element can therefore be advantageously utilized for the actuation of the second shift element, without the dimensions of the transmission being enlarged.

In one possible embodiment, the connection between the first element of the first planetary gear set and the third shift element is arranged at least in part radially within the device for actuating the second shift element. In other words, the connection of the sun gear of the first planetary gear set to the third shift element engages around the device for actuating the second shift element radially at the inside.

The device for actuating the second shift element is preferably connected rotationally fixedly to a holding element, wherein the holding element is connected to the rotationally fixed structural element, that is to say for example to the transmission housing. By the holding element which is separate from the rotationally fixed structural element, the assembly of the transmission can be simplified, in that the first shift element and the three planetary gear sets are inserted into a preferably pot-shaped housing, and subsequently the holding element is installed.

The holding element preferably interacts with at least one axial bearing, wherein said at least one axial bearing is designed for transmitting axial forces from at least one of the planetary gear sets to the holding element. The holding element transmits said forces onward to the rotationally fixed structural element, ideally to the housing of the transmission. The axial forces generated by the helical toothing of the planetary gear sets can in this case be supported over a short distance, whereby the tolerance chain is improved. Furthermore, the drive shaft remains substantially decoupled from the axial forces originating from the planetary gear sets. If other axial forces act on the drive shaft, which are caused for example by actuation of shift elements, the risk of mutual influencing of the load-dependent axial forces of the planetary gear sets and the situation-dependent axial forces of the shift element actuation is reduced.

In one possible embodiment, the preferably releasable connection between the holding element and the rotationally fixed structural element is arranged axially between the third shift element and the first planetary gear set. Such a connection of the holding element simplifies the assembly of the transmission, and also the maintenance thereof in the case of a releasable connection.

In one embodiment, the device for actuating the second shift element is formed as a hydraulic device, which is at least designed to hydraulically close the second shift element. The device is preferably designed to both hydraulically close and hydraulically open the second shift element. Here, the supply of hydraulic fluid to the device takes place through at least one fluid duct which is formed in the holding element. Such a connection to the hydraulic system of the transmission simplifies the guidance of the hydraulic fluid, because there is no need for the fluid to be conducted through rotating parts of the transmission for the purposes of hydraulically actuating the second shift element.

In an alternative embodiment, the device for actuating the second shift element is formed as an electromagnetic or electromechanical device which is at least designed to close the second shift element. In the case of an electromagnetic actuation, the second shift element is preferably opened by spring force. If no electrical current is supplied to the electromagnetic device, the spring force leads to the opening of the second shift element. Such actuation is particularly energy-efficient, because the second shift element is closed only in the first forward gear ratio and in the reverse gear ratio. The second shift element is consequently predominantly open during the operation of the transmission. An electromechanical device is preferably of self-locking design, such that the device maintains its position in the electrically deenergized state. Here, the opening and closing are performed by active electrical energization of the electromechanical device. Alternatively, the opening may also be performed by spring force. The electrochemical device may for example be formed as a ball ramp mechanism or linear actuator, which is driven by an electric motor.

The fourth and fifth shift elements are preferably arranged axially between the electric machine and the second and third shift elements. In this way, it is possible for the three planetary gear sets to be arranged directly on one another, further promoting the short axial construction of the transmission. Here, it is advantageous for the fourth shift element to be arranged at least in part radially within the fifth shift element. Owing to the radial nesting of said two shift elements, the axial structural length of the transmission can be further shortened. Furthermore, the second to fifth shift elements are thus situated in the direct vicinity of one another. This promotes the formation of a compact actuator arrangement for the second to fifth shift elements.

In one embodiment, the three planetary gear sets are arranged axially between the first shift element and the second to fifth shift elements. All of the shift elements are thus arranged axially outside the three planetary gear sets. In this way, the three planetary gear sets can be arranged particularly close together. At the same time, the transmission can thus be of radially particularly compact design.

The transmission may have a connecting shaft which serves as an interface to a drive unit external to the transmission, for example an internal combustion engine. The connecting shaft is connectable by a separating clutch to the drive shaft. Alternatively, the separating clutch together with the connecting shaft may also be arranged outside the transmission. The separating clutch is, as a constituent part of the transmission, preferably arranged radially within the electric machine, particularly preferably within the rotor. This additionally promotes the compact design of the transmission.

The transmission may be a constituent part of a drivetrain of a hybrid vehicle. The drivetrain has not only the transmission but also an internal combustion engine, which is connected rotationally elastically to the drive shaft of the transmission by a torsional vibration damper. A separating clutch, which may be a constituent part of the transmission, is also situated between the drive shaft and internal combustion engine. The output shaft of the transmission is operatively connected in terms of drive to an axle transmission which is connected to wheels of the hybrid vehicle. The drivetrain permits multiple drive modes of the hybrid vehicle. During electric driving operation, the hybrid vehicle is driven by the electric machine of the transmission. During internal combustion engine operation, the hybrid vehicle is driven by the internal combustion engine. In hybrid operation, the hybrid vehicle is driven both by the internal combustion engine and by the electric machine of the transmission.

In a method for launching the hybrid vehicle, proceeding from a standstill state of the hybrid vehicle with the internal combustion engine running, the separating clutch and the second shift element are closed if they are not already closed. When the separating clutch and the second shift element are closed, then for launching in the forward direction the first shift element is transferred from the open state into a slipping state, and for launching in the reverse direction the fifth shift element is transferred from the open state into a slipping state. Here, torque is transmitted from the drive shaft to the output shaft, wherein the slipping operation of the first or of the fifth shift element respectively permits a rotational speed equalization. The first and fifth shift elements thus serve as launch elements, which are arranged within the transmission. The first and fifth shift elements should therefore be formed as frictionally locking shift elements, which permit such slipping operation. The separating clutch thus does not serve as a launch element, and may therefore also be formed as a positively locking shift element. Owing to the arrangement of the launch elements within the transmission, the structural space requirement of the transmission can be further reduced. Since the second shift element is formed as a positively locking shift element, the second shift element cannot serve as launch element. The method for launching thus relates to the transmission described above. This is because a second shift element formed as a frictionally locking shift element would be preferred as a launch element, because this is closed both in the first forward gear ratio and in the reverse gear ratio, and could thus serve as a launch element regardless of the direction of travel of the hybrid vehicle.

A permanent connection refers to a connection between two elements which exists at all times. Such permanently connected elements always rotate with the same dependency between their rotational speeds. No shift element can be situated in a permanent connection between two elements. A permanent connection is therefore distinct from a shiftable connection. A permanently rotationally fixed connection refers to a connection between two elements which exists at all times and whose connected elements thus always have the same rotational speed.

BRIEF DESCRIPTION OF THE DRAWINGS

Exemplary embodiments of the invention will be described in detail below on the basis of the appended figures.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
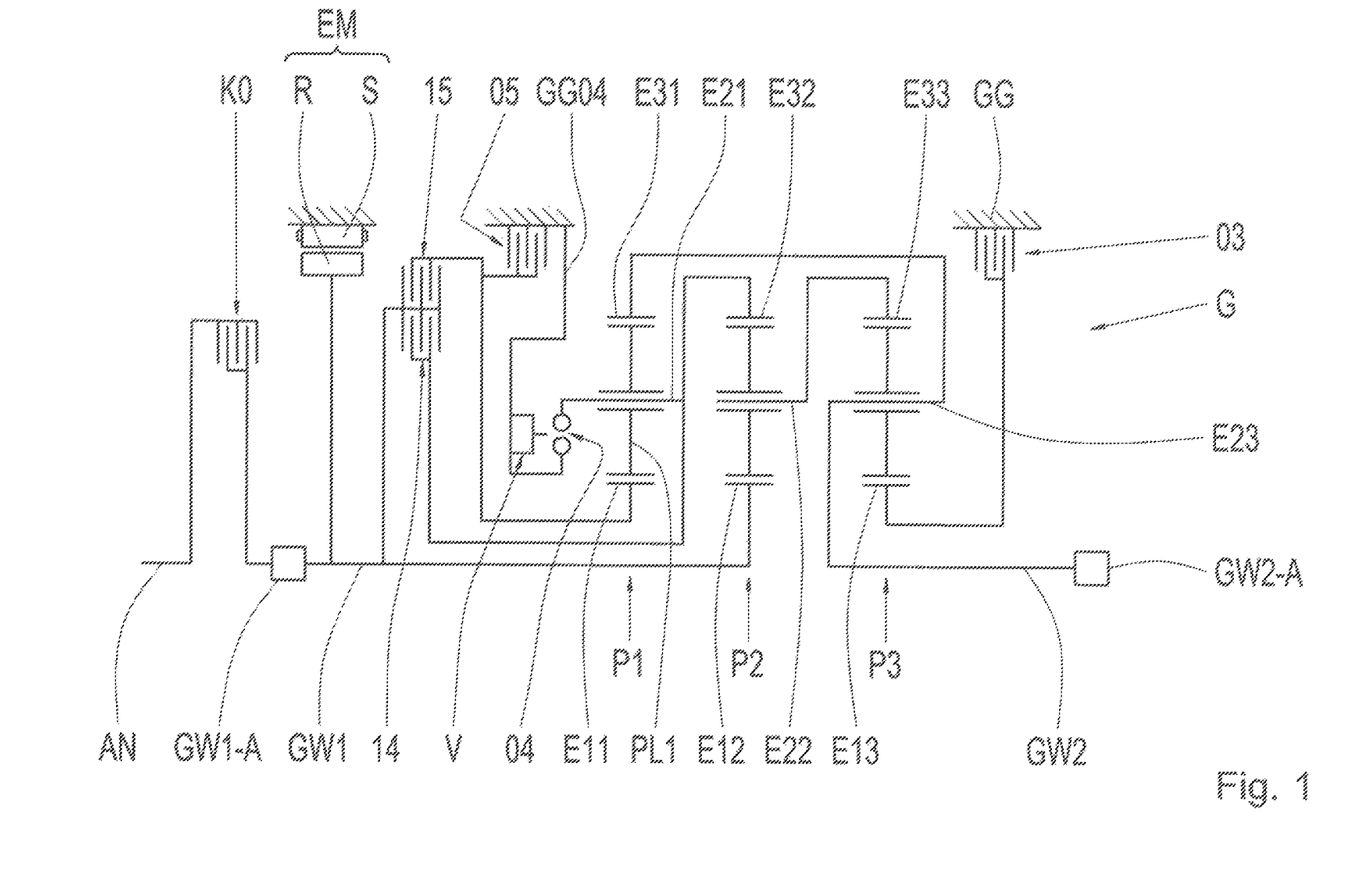
FIG. 1 schematically shows a transmission according to an exemplary embodiment of the invention.

FIG. 1 schematically shows a transmission G according to a first exemplary embodiment of the invention. The transmission G has a first planetary gear set P1, a second planetary gear set P2 and a third planetary gear set P3. Each of the three planetary gear sets P1, P2, P3 has a first element E11, E12, E13, a second element E21, E22, E23 and a third element E31, E32, E33. The first element E11, E12, E13 is always formed by a sun gear of the respective planetary gear set P1, P2, P3. If the planetary gear set is formed as a negative or minus gear set, the second element E21, E22, E23 is formed by a carrier of the respective planetary gear set P1, P2, P3, and the third element E31, E32, E33 is formed by the ring gear of the respective planetary gear set P1, P2, P3. In the embodiment of the transmission G illustrated in FIG. 1, the planetary gear sets P1, P2, P3 are formed as minus gear sets. If a planetary gear set were formed as a positive or plus gear set, the second element E21, E22, E23 would be formed by its ring gear, and the third element E31, E32, E33 thereof would be formed by its carrier. For the sake of clarity, said plus gear set variants are not illustrated in the figures.

A drive shaft GW1 is permanently connected to the first element E12 of the second planetary gear set P2. An output shaft GW2 is permanently connected to the third element E31 of the first planetary gear set P1 and to the second element E23 of the third planetary gear set P3. The second element E21 of the first planetary gear set P1 is permanently connected to the third element E32 of the second planetary gear set P2. The second element E22 of the second planetary gear set P2 is permanently connected to the third element E33 of the third planetary gear set P3. The three planetary gear sets P1, P2, P3 are arranged axially one behind the other in the following sequence: first planetary gear set P1, second planetary gear set P2, third planetary gear set P3.

The transmission G furthermore has a first shift element 03, a second shift element 04, a third shift element 05, a fourth shift element 14, and a fifth shift element 15. The first, third, fourth and fifth shift elements 03, 05, 14, 15 are formed as frictionally locking shift elements, whereas the second shift element 04 is formed as a positively locking shift element. The first element E13 of the third planetary gear set P3 can be rotationally fixedly immobilized by closing the first shift element 03. The first element E13 of the third planetary gear set P3 is thus switchably connected to a rotationally fixed structural element GG of the transmission G, wherein the rotationally fixed structural element GG may be formed by a housing of the transmission G. In the same way, the second element E21 of the first planetary gear set P1, and thus also the third element E32 of the second planetary gear set P2, can be rotationally fixedly immobilized by closing the second shift element 04. A device V for actuating the second shift element is fastened to a holding element GG04, which is connected rotationally fixedly to the rotationally fixed structural element GG. The first element E11 of the first planetary gear set P1 can be rotationally fixedly immobilized by closing the third shift element 05. The third element E32 of the second planetary gear set P2 is connectable to the first element E12 of the second planetary gear set P2 by closing the fourth shift element 14. The drive shaft GW1 is connectable to the first element E11 of the first planetary gear set P1 by closing the fifth shift element 15.

The transmission G furthermore has an electric motor or machine EM, which includes a rotationally fixed stator S and a rotatable rotor R. The rotor R is permanently connected to the drive shaft GW1. The drive shaft GW1 is connectable by a separating clutch K0 to a connecting shaft AN. The connecting shaft AN serves as an interface to a drive unit external to the transmission, for example an internal combustion engine.

The second and third shift elements 04, 05 are arranged axially between the electric machine EM and the first planetary gear set P1. Furthermore, the fourth and fifth shift elements 14, 15 are arranged axially between the second and third shift elements 04, 05 and the electric machine EM, wherein the second shift element 14 is arranged radially within the fifth shift element 15.

External interfaces GW1-A, GW2-A of the drive shaft GW1 and of the output shaft GW2 are arranged coaxially with respect to one another and at axially opposite ends of the transmission G. The transmission G is suitable for use in a drivetrain oriented parallel to the direction of travel of a motor vehicle.

Figure 2:
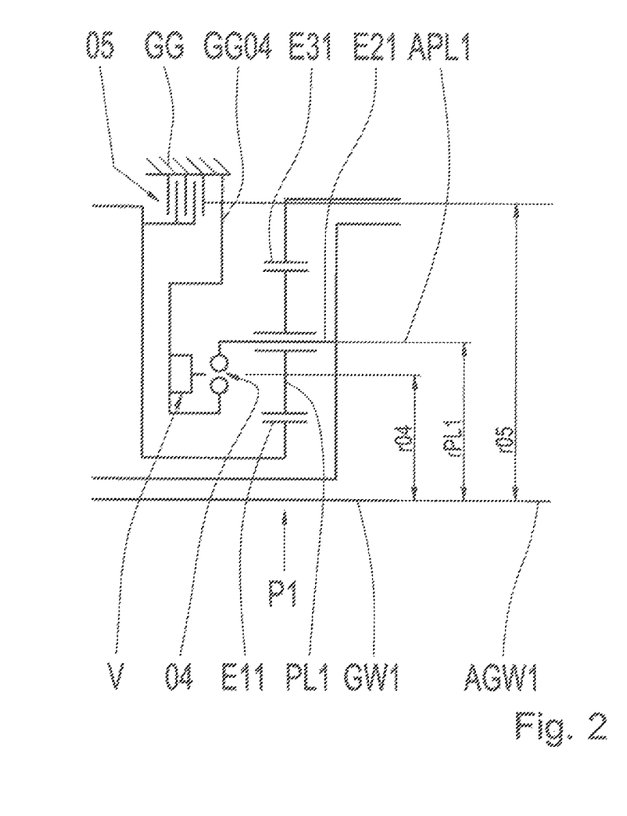
FIG. 2 shows a detail of the schematic illustration of the transmission.

FIG. 2 shows a detail of the transmission G, in which the first planetary gear set P1 with its connecting shafts, the drive shaft GW1, the second and third shift elements 04, 05, the device V, the holding element GG04 and the rotationally fixed structural element GG are schematically illustrated. The effective radius r04 of the second shift element 04, the effective radius r05 of the third shift element 05 and the radial spacing rPL1 from the drive shaft axis AGW1 to the axis of rotation APL1 of one of the planet gears PL1 are indicated here. Here, the effective radius r04 of the second shift element 04 is smaller than the radial spacing rPL1 between the drive shaft axis AGW1 and the axis of rotation APL1 of one of the planet gears PL1. Here, the effective radius r05 of the third shift element 05 is greater than the radial spacing rPL1 between the drive shaft axis AGW1 and the axis of rotation APL1 of the planet gear PL1. The connection between the first element E11 of the first planetary gear set P1 engages around the device V radially at the inside.

Figure 3:
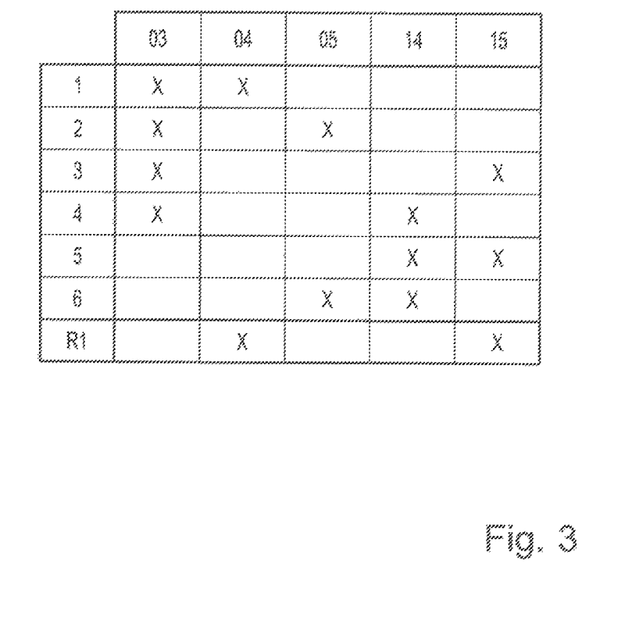
FIG. 3 shows an engagement sequence diagram for the transmission.

FIG. 3 shows an engagement sequence diagram of the transmission G. Six forward gear ratios 1 to 6 and one reverse gear ratio R1 are listed in the rows of the engagement sequence diagram. In the columns of the engagement sequence diagram, an X denotes which shift elements 03, 04, 05, 14, 15 are closed in which forward gear ratio 1 to 6 or reverse gear ratio R1. In the first forward gear ratio 1, the first shift element 03 and the second shift element 04 are closed. In the second forward gear ratio 2, the first shift element 03 and the third shift element 05 are closed. In the third forward gear ratio 3, the first shift element 03 and the fifth shift element 15 are closed. In the fourth forward gear ratio 4, the first shift element 03 and the fourth shift element 14 are closed. In the fifth forward gear ratio 5, the fourth shift element 14 and the fifth shift element 15 are closed. In the sixth forward gear ratio 6, the third shift element 05 and the fourth shift element 14 are closed. In the reverse gear ratio R1, the second shift element 04 and the fifth shift element 15 are closed.

Figure 4:
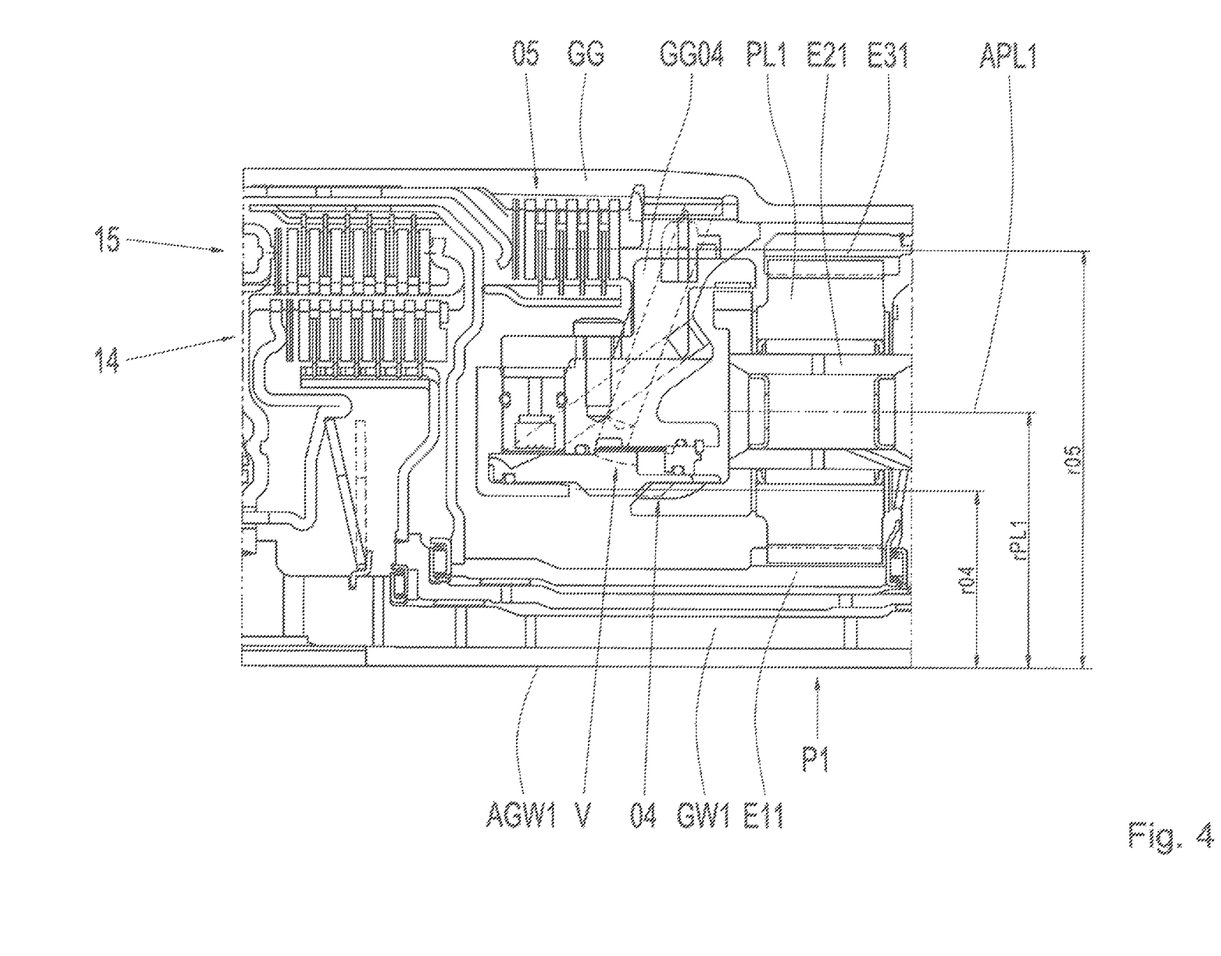
FIG. 4 shows a detail of a sectional illustration of the transmission as per a first embodiment.

FIG. 4 shows a sectional illustration of a part of the transmission G as per a first embodiment. The first planetary gear set P1 is formed as a minus gear set, wherein a dog-clutch toothing is connected to the carrier of the first planetary gear set P1. Said dog-clutch toothing is a constituent part of the second shift element 04. The device V for actuating the second shift element 04, which device is formed as a hydraulic device, is fastened to the holding element GG04. A predominant part of said device V is arranged radially within the third shift element 05. The supply of hydraulic fluid to the device V runs in this case through ducts within the holding element GG04. The device V also has a means for detecting the position of the dog-clutch shift element 04, which means determine the axial position at that end of the displaceable element which is situated opposite the dog-clutch toothing.

Figure 5:
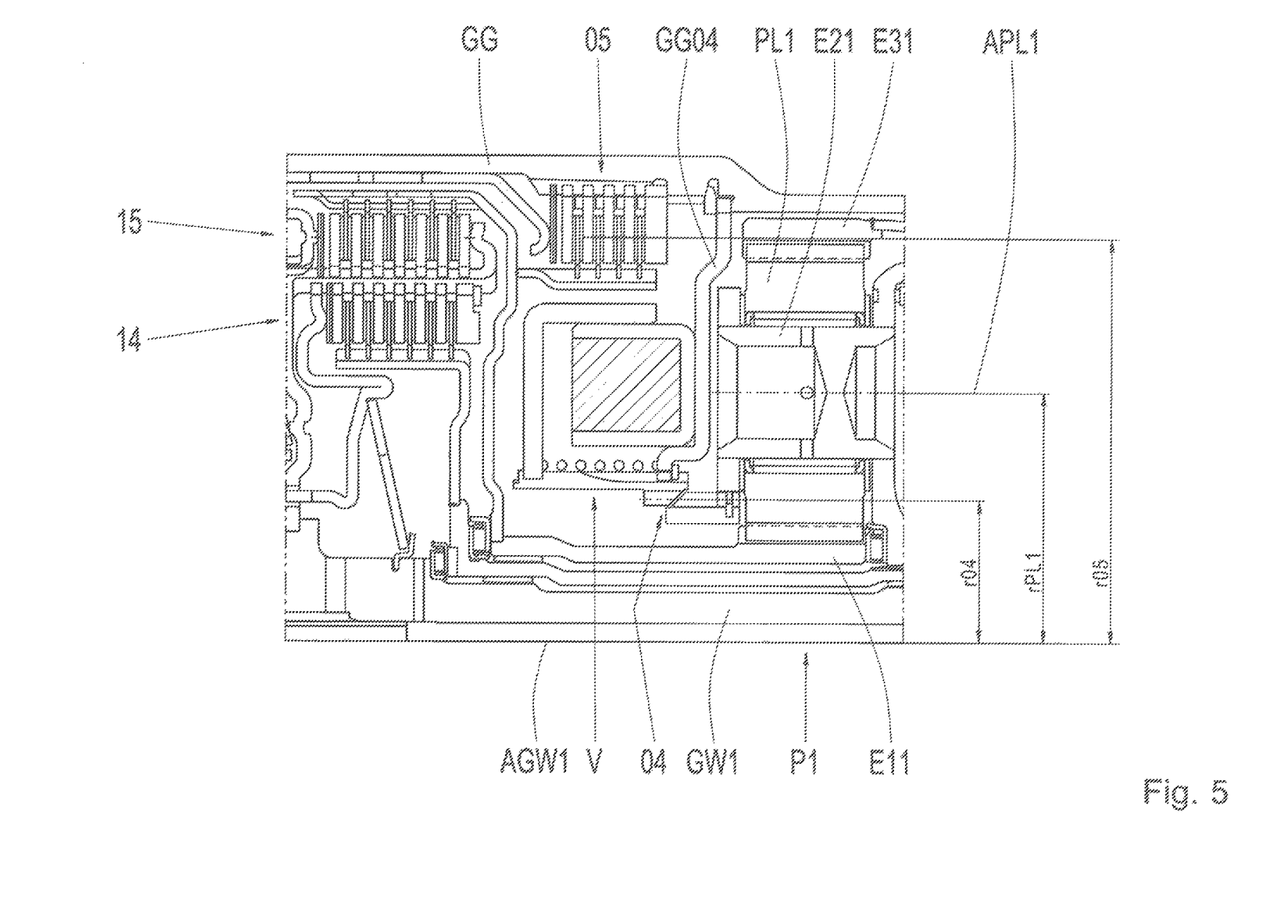
FIG. 5 shows a detail of a sectional illustration of the transmission as per a second embodiment.

FIG. 5 shows a sectional illustration of a part of the transmission G as per a second embodiment. The device V for actuating the second shift element 04, which device is formed as an electromagnetic device, is fastened to the holding element GG04. The electromagnet, illustrated by hatching, is designed such that, when electrically energized, it attracts an armature counter to a spring force, wherein the armature is fixedly connected to the axially displaceable element of the dog-clutch shift element 04. In the electrically deenergized state, the dog-clutch shift element 04 is opened by the spring force. The device V is arranged predominantly radially within the third shift element 05.

Figure 6:
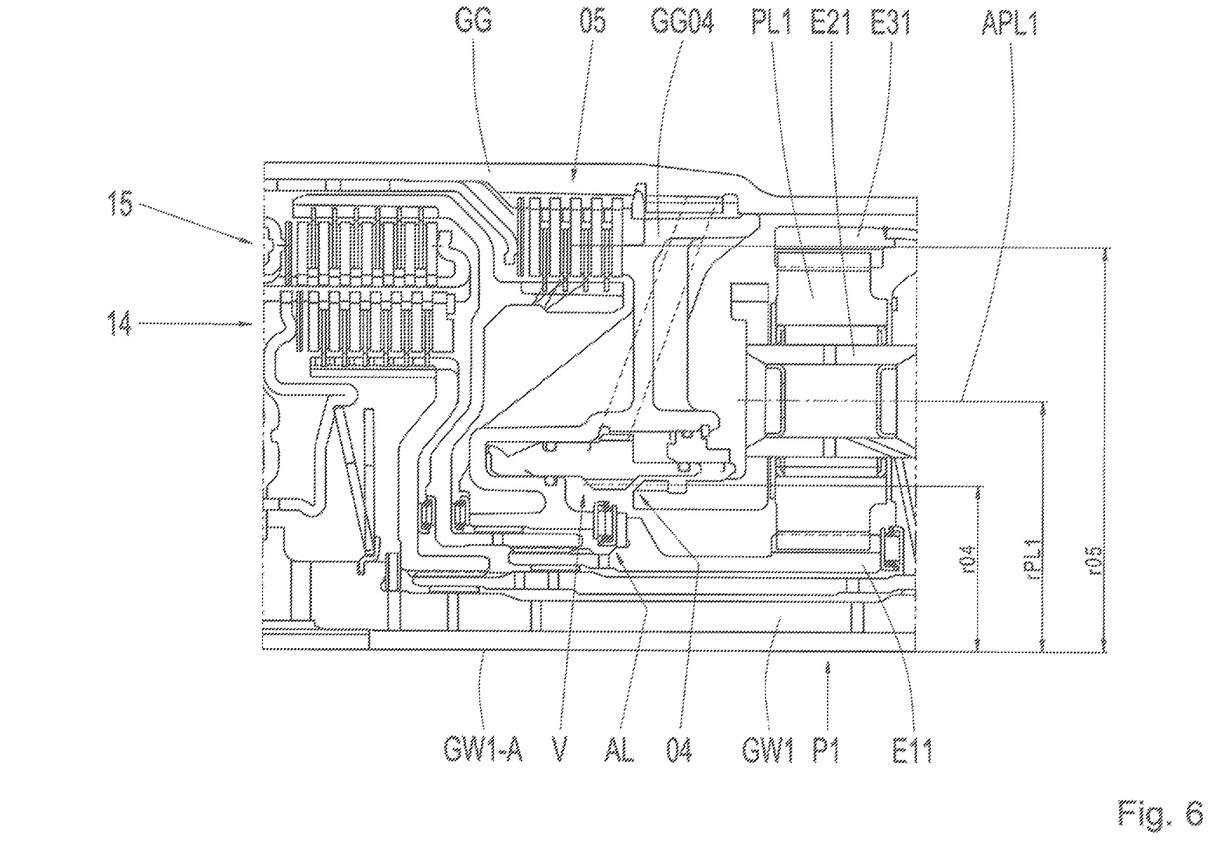
FIG. 6 shows a detail of a sectional illustration of the transmission as per a third embodiment.

FIG. 6 shows a sectional illustration of a part of the transmission G as per a third embodiment. In this, the device V for actuating the second shift element 04 is formed as a hydraulic actuating device, which is designed to hydraulically close and hydraulically open the second shift element 04. Radially within the device V, the holding element GG04 has an abutment against which an axial bearing AL is supported. The axial bearing AL is formed as a rolling bearing and is designed to transmit forces acting in an axial direction from the first planetary gear set P1 to the holding element GG04. The first planetary gear set P1 is thus supported via the axial bearing AL on the holding element GG04 in the presence of a load acting towards the left in the figure. In the presence of a load acting towards the right in the figure, the first planetary gear set P1 is supported on a bearing arrangement on the transmission housing; this is not illustrated in FIG. 6. Radially within the device V, the holding element has a further abutment against which a further axial bearing formed as a rolling bearing is supported. Said axial bearing could also be formed as a sliding disk, because the axial load generated by the planetary gear sets is at least predominantly supported on the rotationally fixed structural element GG via the axial bearing AL and the holding element GG04.

The connection between the first element E11 of the first planetary gear set P1 and the third shift element 05 runs radially within the axial bearing AL, wherein said connecting shaft, which has a division, has a radial bore provided therein. Oil for lubrication purposes can be supplied to the axial bearing via said radial bore.

Figure 7:
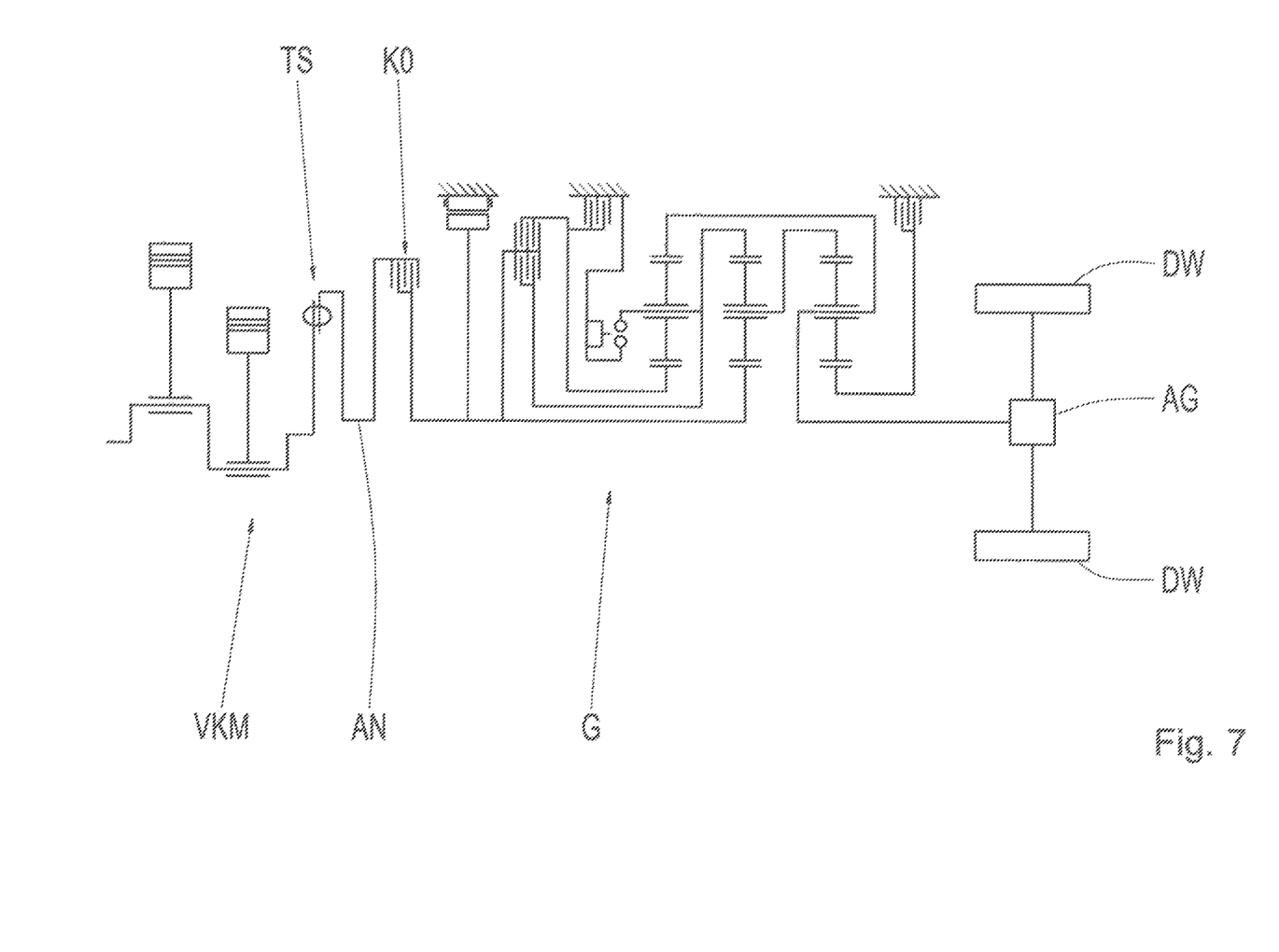
FIG. 7 shows a drivetrain of a hybrid vehicle.

FIG. 7 schematically shows a drivetrain of a hybrid vehicle. An internal combustion engine VKM is connected via a torsional vibration damper TS to the connecting shaft AN of the transmission G. The connecting shaft AN is connectable to the drive shaft GW1 of the transmission G via the separating clutch K0. The output shaft GW2 is connected to an axle transmission AG, via which the power acting at the output shaft GW2 is distributed to drive wheels DW of the motor vehicle.

Modifications and variations can be made to the embodiments illustrated or described herein without departing from the scope and spirit of the invention as set forth in the appended claims.

REFERENCE DESIGNATIONS

G Transmission
GG Rotationally fixed structural element
GG04 Holding element
P1 First planetary gear set
E11 First element of the first planetary gear set
E21 Second element of the first planetary gear set
E31 Third element of the first planetary gear set
PL1 Planet gear of the first planetary gear set
APL1 Axis of rotation of the planet gear
rPL1 Radial spacing between drive shaft axis and planet gear axis
P2 Second planetary gear set E12 First element of the second planetary gear set
E22 Second element of the second planetary gear set
E32 Third element of the second planetary gear set
P3 Third planetary gear set
E13 First element of the third planetary gear set
E23 Second element of the third planetary gear set
E33 Third element of the third planetary gear set
GW1 Drive shaft
AGW1 Drive shaft axis
GW2 Output shaft
GW1-A External interface of the drive shaft
GW2-A External interface of the output shaft
EM Electric machine
R Rotor
S Stator
03 First shift element
04 Second shift element
r04 Effective radius of the second shift element
V Device for actuating the second shift element
05 Third shift element
r05 Effective radius of the third shift element
14 Fourth shift element
15 Fifth shift element
AL Axial bearing
AN Connecting shaft
K0 Separating clutch
VKM Internal combustion engine
TS Torsional vibration damper
DW Wheels
AG Axle transmission
1 to 6 Forward gear ratios
R1 Reverse gear ratio

The invention claimed is:

1. A transmission (G) for a hybrid vehicle, comprising:
a drive shaft (GW1);
an output shaft (GW2);
a plurality of planetary gear sets including a first planetary gear set (P1), a second planetary gear set (P3) and a third planetary gear set (P3);
an electric motor (EM) with a rotationally fixed stator (S) and a rotatable rotor (R); and
a plurality of shift elements including a first shift element (03), a second shift element (04), a third shift element (05), a fourth shift element (14) and a fifth shift element (15),
wherein each of the first, second and third planetary gear sets (P1, P2, P3) has one first element (E11, E12, E13), one second element (E21, E22, E23) and one third element (E31, E32, E33), the first element (E11, E12, E13) of each of the first, second and third planetary gear sets (P1, P2, P3) is formed by a sun gear of the respective planetary gear set (P1, P2, P3), the second element (E21, E22, E23) of each of the first, second and third planetary gear sets (P1, P2, P3) is formed by a carrier of the respective planetary gear set (P1, P2, P3) in the case of a negative gear set and by a ring gear of the respective planetary gear set (P1, P2, P3) in the case of a positive gear set, and the third element (E31, E32, E33) of the respective planetary gear set (P1, P2, P3) is formed by the ring gear of the respective planetary gear set (P1, P2, P3) in the case of the negative gear set and by the carrier of the respective planetary gear set (P1, P2, P3) in the case of the positive gear set,
wherein the drive shaft (GW1) is permanently connected to the first element (E12) of the second planetary gear set (P2),
wherein the output shaft (GW2) is permanently connected to the third element (E31) of the first planetary gear set (P1) and to the second element (E23) of the third planetary gear set (P3),
wherein the second element (E21) of the first planetary gear set (P1) is permanently connected to the third element (E32) of the second planetary gear set (P2),
wherein the second element (E22) of the second planetary gear set (P2) is permanently connected to the third element (E33) of the third planetary gear set (P3),
wherein the first element (E13) of the third planetary gear set (P3) is rotationally fixable by closing the first shift element (03),
wherein the second element (E21) of the first planetary gear set (P1) is rotationally fixable by closing the second shift element (04),
wherein the first element (E11) of the first planetary gear set (P1) is rotationally fixable by closing the third shift element (05),
wherein two of the three elements (E12, E22, E32) of the second planetary gear set (P2) are connectable to one another by closing the fourth shift element (14),
wherein the drive shaft (GW1) is connectable to the first element (E11) of the first planetary gear set (P1) by closing the fifth shift element (15),
wherein the rotor (R) of the electric machine (EM) is permanently connected to the drive shaft (GW1),
wherein the second and third shift elements (04, 05) are arranged axially between the electric motor (EM) and the first planetary gear set (P1), and
wherein an effective radius (r05) of the third shift element (05) is greater than an effective radius (r04) of the second shift element (04), the third shift element (05) is formed as a frictionally locking shift element, and the second shift element (04) is formed as a positively locking shift element.

2. The transmission (G) of claim 1, wherein the effective radius (r04) of the second shift element (04) is less than a radial spacing (rPL1) between a drive shaft axis (AGW1) and an axis of rotation (APL1) of a planet gear (PL1) of the first planetary gear set (P1), and the effective radius (r05) of the third shift element (05) is greater than the radial spacing (rPL1) between the drive shaft axis (AGW1) and the axis of rotation (APL1) of the planet gear (PL1) of the first planetary gear set (P1).

3. The transmission (G) of claim 1, wherein the first, fourth and fifth shift elements (03, 14, 15) are formed as frictionally locking shift elements.

4. The transmission (G) of claim 1, wherein a device (V) for actuating the second shift element (04) is arranged at least in part radially within the third shift element (05).

5. The transmission (G) of claim 4, wherein the device (V) for actuating the second shift element (04) is disposed predominantly in a structural space which is situated radially within the third shift element (05).

6. The transmission (G) of claim 1, wherein a connection between the first element (E11) of the first planetary gear set (P1) and the third shift element (05) is arranged at least in part radially within a device (V) for actuating the second shift element (04).

7. The transmission (G) of claim 1, wherein a device (V) for actuating the second shift element (04) is connected rotationally fixedly to a holding element (GG04) which is connected rotationally fixedly to a rotationally fixed structural element (GG) of the transmission (G).

8. The transmission (G) of claim 7, wherein the holding element (GG04) interacts with at least one axial bearing (AL), and the at least one axial bearing (AL) is configured to transmit axial forces from at least one of the first, second and third planetary gear sets (P1, P2, P3) to the holding element (GG04).

9. The transmission (G) of claim 7, wherein a connection between the holding element (GG04) and the rotationally fixed structural element (GG) is arranged axially between the third shift element (05) and the first planetary gear set (P1).

10. The transmission (G) of claim 7, wherein the device (V) for actuating the second shift element (04) is a hydraulic device which is configured to hydraulically close and/or hydraulically open the second shift element (04), wherein a supply of hydraulic fluid to the hydraulic device (V) is performed through at least one flow duct in the structural element (GG04).

11. The transmission (G) of claim 1, wherein a device (V) for actuating the second shift element (04) is an electromagnetic or electromechanical device which is configured to close the second shift element (04).

12. The transmission (G) of claim 1, wherein the fourth and fifth shift elements (14, 15) are arranged axially between the electric motor (EM) and the second and third shift elements (04, 05), and the fourth shift element (14) is arranged at least in part radially within the fifth shift element (15).

13. The transmission (G) of claim 1, wherein the first, second and third planetary gear sets (P1, P2, P3) are arranged axially between the first shift element (03) and the second through fifth shift elements (04, 05, 14, 15).

14. The transmission (G) of claim 1, further comprising a connecting shaft (AN) as an interface to a drive unit external to the transmission, wherein the connecting shaft is connectable by a separating clutch (K0) to the drive shaft (GW1), and the separating clutch (K0) is arranged radially within the electric motor (EM).

15. A drivetrain for a hybrid vehicle, comprising an internal combustion engine (VKM), the transmission (G) according to claim 1, and an axle transmission (AG) which is connected to wheels (DW) of the hybrid vehicle, wherein the drive shaft (GW1) of the transmission (G) is connected rotationally elastically to the internal combustion engine (VKM) by a separating clutch (K0) within the transmission or a separating clutch (K0) external to the transmission and a torsional vibration damper (TS), and the output shaft (GW2) of the transmission (G) is operatively connected to the axle transmission (AG).

16. A method for launching a hybrid vehicle having the drivetrain of claim 15, comprising:

proceeding from a standstill state of the hybrid vehicle with the internal combustion engine (VKM) running, closing or keeping closed the separating clutch (K0) and the second shift element (04); and with the separating clutch (K0) and second shift element (04) closed, transferring the first shift element (03) from an open state into a slipping state for launching in the forward direction or transferring the fifth shift element (15) from the open state into the slipping state for launching in the reverse direction, whereby torque is transmitted from the drive shaft (GW1) to the output shaft (GW2).

* * * * *